Feb. 6, 1962 G. A. PAULSRUD 3,019,689
OPTICAL VIEWING DEVICE
Filed Jan. 18, 1961
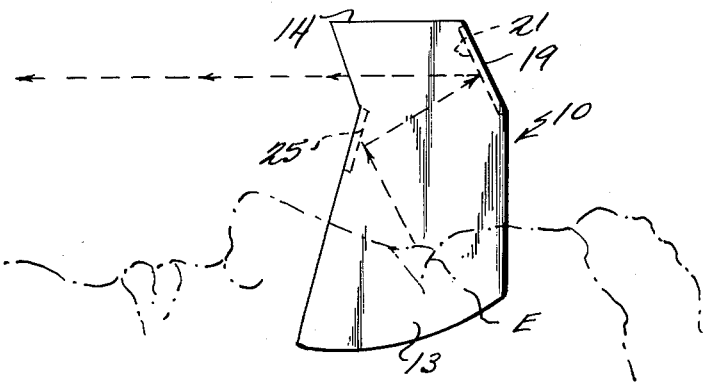
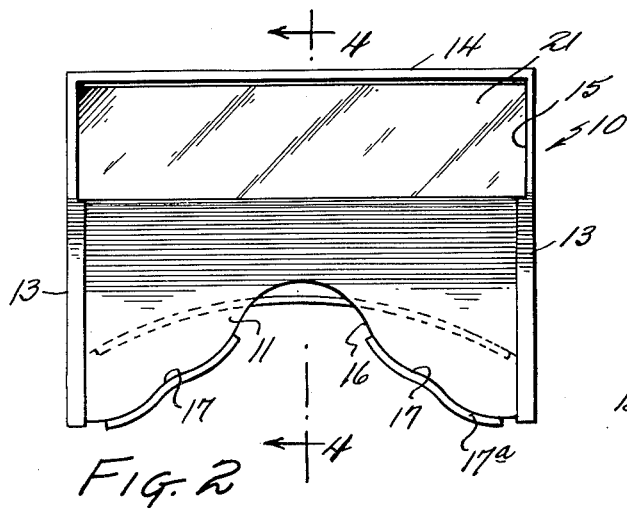
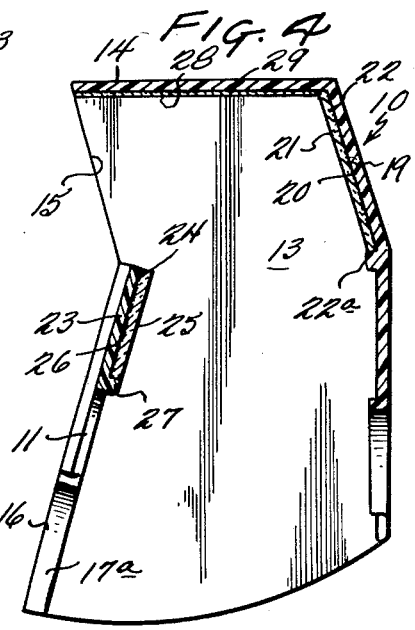
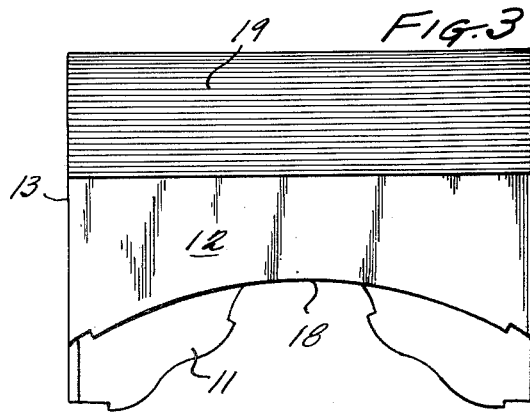
INVENTOR
GEARHARDT A. PAULSRUD
BY
Kimmel & Crowell
ATTORNEYS 3,019,689
Patented Feb. 6, 1962

3,019,689
OPTICAL VIEWING DEVICE
Gerhardt A. Paulsrud, 408 Kings Highway,
Sioux City, Iowa
Filed Jan. 18, 1961, Ser. No. 83,404
1 Claim. (Cl. 88—1)

This invention relates to an optical viewing device and has as its primary object the provision of a device whereby an individual in prone position such, for example, as a bed ridden patient in a hospital, may readily view objects in horizontal line such, for example, as a television screen.

An additional important object of the invention is the provision of such a device which is characterized by extreme simplicity of construction, being formed from a single molded or cast plastic shell having suitably positioned mirrors therein.

An additional object of the invention is the provision of such a device characterized by the complete absence of moving parts, wherein adjustability may be achieved by positioning the device on the user's nose, the angle of inclination being adjusted to the eyes by the relative position on the nose.

A further object of the invention is the provision of a device of this character which may be manufactured with a minimum of expense, thus facilitating distribution among charity patients, or among others whose resources are limited.

Still another object of the invention is the provision of a device of this character which requires no straps or other attachments to hold the same in position over the eyes of the user, and which, by virtue of its extremely light weight and the contours of its construction, is relatively comfortable to use.

Still other objects will in part be obvious and in part be pointed out as the description of the invention proceeds, and shown in the accompanying drawing wherein there is disclosed a preferred embodiment of this inventive concept.

In the drawing:

FIGURE 1 is an end elevational view of the device in use, certain interior portions being indicated in dotted lines, the face of the user also being indicated in dotted lines.

FIGURE 2 is a front elevational view of the device of FIG. 1.

FIGURE 3 is a rear elevational view; and

FIGURE 4 is an enlarged sectional view taken substantially along the line 4—4 of FIG. 2 as viewed in the direction indicated by the arrows.

Similar reference characters refer to similar parts throughout the several views of the drawing.

Having reference now to the drawing in detail, there is generally indicated at 10 a shell, which is preferably formed or molded as a single integral unit, and comprised of a suitable plastic. Any desired material may be used, such as styrofoam plastic. The shell 10 comprises a front wall 11, a rear wall 12, the front and rear walls being connected by integral end walls 13, and a top wall 14, and is dimensioned to fit comfortably over the eyes E of an individual in prone position. Front wall 11 is provided at its upper extremity with an elongated rectangular opening 15, which extends the full width of the device, and at its lower end with an arcuate cut-out portion 16 which is adapted to rest on the ridge of the nose N of the user. Arcuate portions 17 provided with integral flanges 17a extend on opposite sides of portion 16 and rest on the cheeks of the user. Rear wall 12 is provided with an arcuate cut-away portion 18, which rests on the forehead of the user when the device is in operative position.

Rear wall 12 adjacent its juncture with top wall 14 is inclined forwardly as at 19, and has a forwardly and downwardly inclined inner face 20 in alignment with opening 15, to which face is secured a mirror 21, in any desired manner as by adhesive 22. A horizontal flange 22a supports mirror 21.

Front wall 11 is inclined upwardly and rearwardly as at 23 between the opening 15 and the arcuate portion 16, and has an inwardly and downwardly inclined inner face 24 to which a second mirror 25 is suitably affixed as by means of adhesive 26, the mirror being supported on a rib 27. The arrangement is thus such that the line of vision follows the arrows as indicated in FIG. 1, being directed from the eye to the mirror 25 and thence reversely to mirror 21, and thence forwardly horizontally to the object to be viewed.

The interior of the device may be of any desired color, although the underside of top wall 14 is preferably black which should be blackened to avoid distorting reflections. This blackening may be accomplished by the attachment of a sheet of black paper 28 to the under inner side of top wall 14 in any desired manner, as for example, by adhesive 29.

In the use and operation of the device, the shell 10 is simply placed on the face of the user, as shown in FIG. 1, and by movement along the ridge of the nose, the angle of inclination of the mirrors 25 and 21 may be suitably adjusted so that the television screen or other object to be viewed is suitably aligned with the user's eyes. There are no straps or other attachments, and, due to the light weight and configuration of the underside of the appliance, the same may be worn without discomfort.

From the foregoing it will now be seen that there is herein provided a device which accomplishes all the objects of this invention, and others, including many advantages of great practical utility.

As many embodiments may be made of this inventive concept, and as many modifications may be made in the embodiment hereinbefore shown and described, it is to be understood that all matter herein is to be interpreted merely as illustrative, and not in a limiting sense.

I claim:

An instrument for use in horizontal viewing while in a reclining position comprising a lightweight plastc materal casing, said casing including a rear wall portion having ntegrally formed side walls perpendicular thereto, an integral top wall, a portion of said rear wall adjacent the top wall being angularly disposed with respect thereo, a first integral flange on said rear wall adjacent said angularly disposed portion and extending between said side walls, second and third spaced integral flanges on the angularly disposed portion of said rear wall extending between said first integral flange and said top wall, a first generally rectangular mirror secured to said angularly disposed rear wall portion in the area defined by said first, second, and third integral flanges and said top wall, the lower end of said rear wall having an arcuate cut away flanged lower portion adapted to seat on the forehead of the user, the free front edges of said side walls each having first inclined portions and second oppositely inclined portions, integral flanges on said side walls, perpendicular thereto and adjacent said first inclined portions, an inclined front wall secured between said first inclined portions of said side walls and in engagement with the integral flanges thereon, the lower end of said front wall having an arcuate cut away flanged portion adapted to seat on the nose and cheeks of the user, the upper end of said front wall, the second inclined portions of said side walls, and an edge of said top wall defining an opening in alignment with said first rectangular mirror, said front wall further including a first integral flange adjacent the upper end thereof, a second integral flange on said front wall in spaced parallel relation to said first, a pair of integral flanges extending between said first and second integral flanges and with the same defining a generally rectangular area, a second rectangular mirror secured to said front wall in the generally rectangular area whereby light entering the opening in alignment with said first mirror is reflected to said second mirror and to the eyes of the user.

References Cited in the file of this patent

UNITED STATES PATENTS

| | | |
|---|---|---|
| 2,123,682 | Wingate | July 12, 1938 |
| 2,211,480 | Ring | Aug. 13, 1940 |
| 2,522,938 | Francis et al. | Sept. 19, 1950 |
| 2,909,959 | Girden | Oct. 27, 1959 |
| 2,926,239 | Skellett | Feb. 23, 1960 |